US010012317B2

(12) United States Patent
Sucher (10) Patent No.: US 10,012,317 B2
(45) Date of Patent: Jul. 3, 2018

(54) ISOLATION VALVE WITH A DEAD CHAMBER (71) Applicant: TOTAL MARKETING SERVICES, Puteaux (FR)

(72) Inventor: Xavier Sucher, Rueil Malmaison (FR)

(73) Assignee: Total Marketing Services, Puteaux (FR)

( * ) Notice: Subject to any disclaimer, the term of this patent is extended or adjusted under 35 U.S.C. 154(b) by 21 days.

(21) Appl. No.: 15/039,925

(22) PCT Filed: Nov. 28, 2014

(86) PCT No.: PCT/EP2014/075992
§ 371 (c)(1),
(2) Date: May 27, 2016

(87) PCT Pub. No.: WO2015/079034
PCT Pub. Date: Jun. 4, 2015

(65) Prior Publication Data
US 2017/0002934 A1 Jan. 5, 2017

(30) Foreign Application Priority Data
Nov. 29, 2013 (FR) ..................... 13 61824

(51) Int. Cl.
F16K 5/02 (2006.01)
F16K 5/04 (2006.01)
(Continued)

(52) U.S. Cl.
CPC .......... *F16K 5/0207* (2013.01); *F16K 5/0407* (2013.01); *F16K 5/0605* (2013.01); *F16K 5/162* (2013.01); *F16K 17/0406* (2013.01)

(58) Field of Classification Search
CPC ....... Y10T 137/88022; Y10T 137/8803; Y10T 137/88038; F16K 5/0605; F16K 17/0406;
(Continued)

(56) References Cited

U.S. PATENT DOCUMENTS 2,872,155 A 2/1959 Hazard
4,530,375 A * 7/1985 Bey ........................... F16K 5/10
137/614.17
(Continued)

FOREIGN PATENT DOCUMENTS

EP 2119946 A1 11/2009
EP 2423549 A1 2/2012
(Continued)

*Primary Examiner* — Michael R Reid
(74) *Attorney, Agent, or Firm* — Harness, Dickey & Pierce, PLC (57) ABSTRACT An isolation valve includes a dead chamber, including a body with a fluid-passing conduit, a device for obturating the fluid passage in the conduit, which may be actuated between a fluid-passing position and a position for obturating the fluid passage in the conduit. In its obturation position, the obturation device forms a dead chamber. A wall of the obturation device comprises a through-hole, in which is positioned a device for decompression of the dead chamber. A hydrocarbon transport facility includes at least two pipes connected through such an isolation valve with a dead chamber.

15 Claims, 8 Drawing Sheets (51) Int. Cl.
*F16K 5/06* (2006.01)
*F16K 5/16* (2006.01)
*F16K 17/04* (2006.01)

(58) Field of Classification Search
CPC ...... F16K 5/162; F16K 5/0207; F16K 5/0407;
F16K 15/18; F16K 15/183; F16K 15/188;
F16K 1/24; F16K 39/06; F16K 39/045;
F16K 39/024
USPC ........................................ 137/614.16–614.18
See application file for complete search history.

(56) References Cited

U.S. PATENT DOCUMENTS

| | | |
|---|---|---|
| 6,926,504 B2 | 8/2005 | Howard |
| 9,140,410 B2 | 9/2015 | Malnou |
| 2013/0277236 A1 | 10/2013 | Hein et al. |
| 2015/0101687 A1* | 4/2015 | Shubat .................. F16K 5/0605 137/513.7 |

FOREIGN PATENT DOCUMENTS

| | | | |
|---|---|---|---|
| FR | 2432661 A1 | 2/1980 | |
| GB | 337339 A | 10/1930 | |
| GB | 1346357 A | 2/1974 | |
| GB | 2226385 A | 6/1990 | |
| JP | H08-219298 A | 8/1996 | |
| JP | 2002-081553 A | 3/2002 | |
| WO | WO 2013123819 A1 * | 8/2013 | ........... F16K 5/0689 |

* cited by examiner

Fig.1

PRIOR ART

ISOLATION VALVE WITH A DEAD CHAMBER

CROSS-REFERENCE TO RELATED APPLICATIONS

This application is a National Phase Entry of International Patent Application No. PCT/EP2014/075992, filed on Nov. 28, 2014, which claims priority to French Patent Application Serial No. 13 61 824, filed on Nov. 29, 2013, both of which are incorporated by reference herein.

BACKGROUND AND SUMMARY

The present invention relates to an isolation valve with a dead chamber.

In the petroleum field, it is known how to apply isolation valves with a dead chamber on pipings conveying hydrocarbons for example. Such valves actually give the possibility of isolating a segment of a pipeline in a leak-proof way, thereby giving the possibility of stopping the supply to a fire, of avoiding a hydrocarbon leak, ensuring maintenance on the pipeline or perfectly segregating various products by avoiding any cross-contamination. This type of isolation valve is particularly interesting because it ensures a dual seal:

between the upstream area and the dead chamber, on the one hand; and between the dead chamber and the downstream area, on the other hand.

Figure 1:
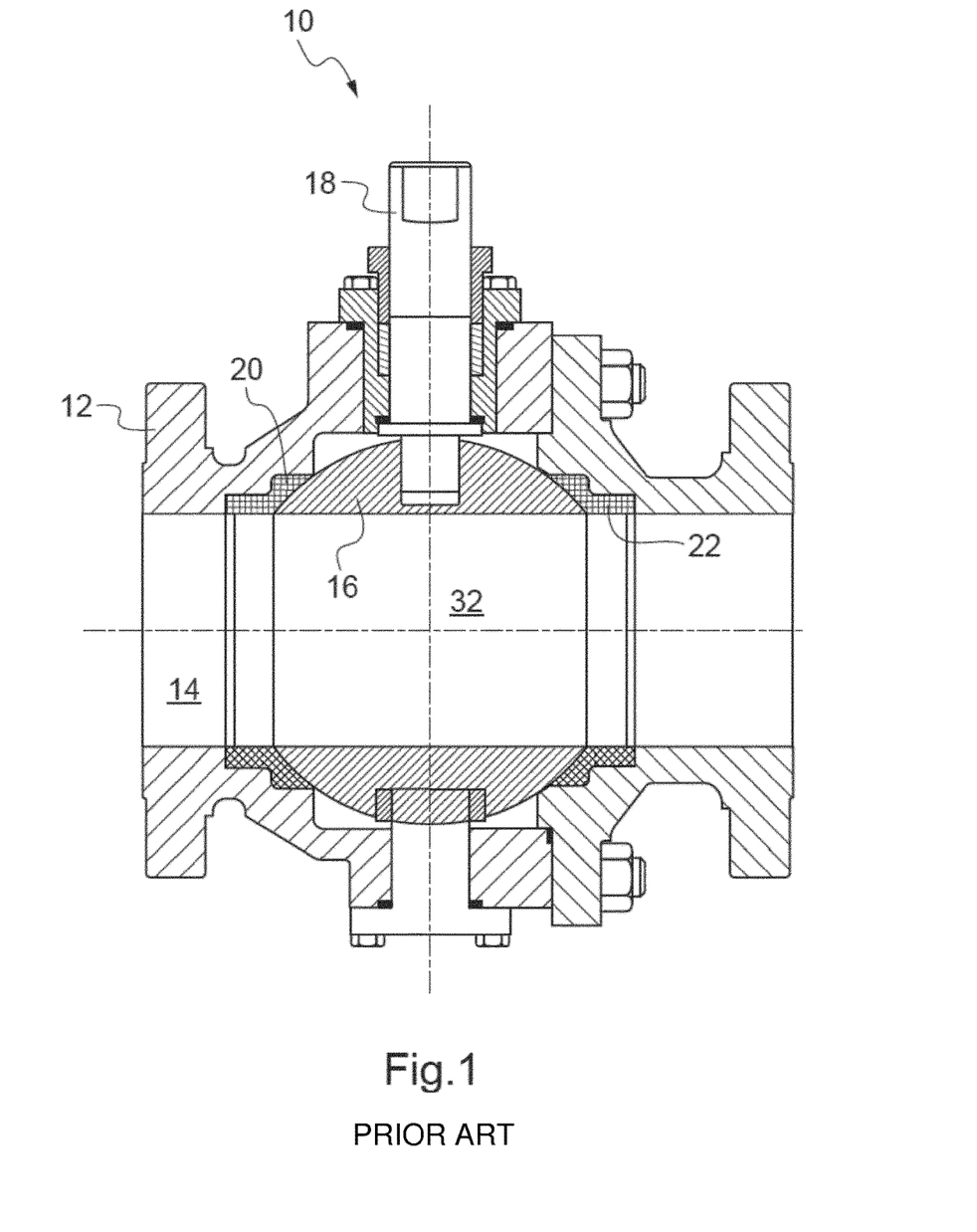
FIG. 1 schematically illustrates a sectional view of an example of an isolation valve with a spherical ball, in the fluid-passing position.

An example of an isolation valve with a dead chamber is illustrated in FIG. 1. In this case, the illustrated isolation valve 10 is of the ball type. Such an isolation valve conventionally comprises a body 12 with a fluid-passing conduit 14, a ball 16, and a stem 18 for actuating the ball 16, giving the possibility of actuating the ball 16 between a fluid-passing position through the conduit 14 (position illustrated in the figure) and a position for obturating the conduit 14. The actuation of the ball 16 here consists in rotating by a quarter of a turn the ball 16 around the axis of the stem 18.

The isolation valve 10 of FIG. 1 also comprises upstream 20 and downstream 22 seats sealably bearing against the ball 16 around the fluid-passing conduit 14, on the one hand and against the body 12, on the other hand. It is known that in such an isolation valve 10, the ball has a cavity 32 which forms, in the obturation position of the fluid-passing conduit, together with the body 12, a dead chamber. This dead chamber contains fluid—a hydrocarbon in the application mentioned hereinbefore—confined in the cavity 32, at the moment when the spherical ball 16 passes from its fluid-passing position to its position for obturating the fluid-passing conduit 14.

Now, this type of valve may be exposed to variations in temperature. An increase in the temperature generates an expansion of the liquid confined in the dead chamber, which, because of the incompressibility of the latter, generates a rise in pressure in the dead chamber. This rise in pressure may, in extreme cases, lead to bursting of the isolation valve. For example, the expansion of a hydrocarbon is of the order of 0.1% of the volume per degree Celsius which, by neglecting the expansion of the body of the isolation valve due to its thermal expansion and due to the rise in pressure and considering a perfect seal, leads to an increase in pressure of the order of 10 bars/° C.

In order to reduce the pressure in the dead chamber, it is known how to design this type of isolation valve with a device giving the possibility of decompressing the dead chamber. This device may consist in seats adapted for moving away from the ball in the case of overpressure in the dead chamber. However, such seats are detrimental to the seal of the isolation valve. Alternatively, the decompression device may be positioned outside the body and be connected to the dead chamber through a conduit crossing the body.

However, for safety reasons, the isolation valve should, when it is subject to a fire:

not leak in a line towards the downstream area, for ensuring the isolation;

not leak towards the outside of the isolation valve, in order to avoid feeding the fire in which the valve is found; and allow control of the increase in pressure inside the isolation valve and notably inside the dead chamber in order to avoid failure of the isolation valve.

It is found that applying a decompression device outside the body creates vulnerability of the isolation valve, notably in the case of a fire since the latter is then exposed to flames and to high temperatures. Such a solution therefore does not give the possibility of ensuring the fire resistance criteria mentioned above. Therefore there exists a need for an isolation valve with a dead chamber having increased fire resistance.

Further, FR-A-2 432 661 relates to a hydraulic distributor device comprising a ball plug valve. Document EP-A-2 423 549 relates to a safety discharge device for a two-way valve. Document GB-A-2,226,385 relates to a spherical ball valve.

Moreover, document GB-A-1,346,357 relates to a valve with a spherical rotating body comprising, in a wall of the spherical rotating body, a passage for circulation of fluid obstructed by a pressure discharge device. The pressure discharge device comprises an element directly flattened against the wall of the rotating body by means of a spring itself bearing against a plug screwed into the passage of the spherical rotating body. The pressure discharge device is adapted, under the effect of an increase in pressure inside the spherical rotating body, for moving the element in order to clear the passage formed in the wall of the rotating body. The valve with a spherical rotating body of document GB-A-1, 346,357 has the drawback of preventing any adjustment of the discharge device prior to its mounting on the valve with a spherical rotating body so that the mounting of the pressure discharge device in the passage of the spherical rotating body interferes with the adjustment of the spring. Further, the configuration of the spherical rotating body only allows limited passing of fluid through the passage causing significant drops in pressure on the one hand and a risk of failure in the case of a significant increase in pressure, for example during a high heat input.

For this purpose, the present invention proposes an isolation valve with a dead chamber, including a body with a fluid-passing conduit, a device for obturating the fluid passage in the conduit, which may be actuated between a fluid-passing position and a position for obturating the fluid passage in the conduit, an obturation position in which the obturation device forms a dead chamber, a wall of the obturation device comprising a through-hole, in which is positioned a device for decompression of the dead chamber, the obturation device including a tapered rotating plug. According to preferred embodiments, the invention comprises one or several of the following features:

the decompression device is formed with a calibrated valve;

the calibrated valve is screwed, pinned or force-fitted into the wall of the obturation device;

the through-hole is made between the dead chamber and the fluid-passing conduit;

the through-hole is made in the wall of the obturation device intended to be positioned upstream from the isolation valve, in a position for obturating the passage for fluid in the conduit;

the rotating body also comprises two sliders translationally mounted on the tapered plug in the body, for example by means of a dovetail, so that a translation of the tapered plug along its axis induces translation of both sliders along a direction substantially perpendicular to the direction of the axis of the tapered plug;

the device for decompression of the dead chamber is positioned in one of the two sliders;

the tapered plug has a shaft for guiding the rotation of the rotating body.

The invention also relates to a hydrocarbon transport facility including at least two pipes connected through an isolation valve with a dead chamber as described hereinbefore, in all of its combinations. Other features and advantages of the invention will become apparent upon reading the description which follows of preferred embodiments of the invention, given as an example and with reference to the appended drawings.

DETAILED DESCRIPTION

An isolation valve with a dead chamber is proposed, comprising a body, a fluid-passing conduit into the body and an obturation device which may be actuated between a position for obturating the fluid-passing conduit and a fluid-passing position. The obturation device forms, in the obturation position, a dead chamber. The obturation device has a hole, notably between the dead chamber in its obturation position and the fluid-passing conduit. Inside this hole a decompression device is positioned which gives the possibility of avoiding that the dead chamber pressure exceeds a threshold valve, critical for the integrity of the isolation valve. This decompression device may notably assume the shape of a bushing with a pre-stressed ball against an orifice of the bushing by means of a calibrated spring. Other forms of the decompression device are possible, notably a device with a dual ball and spring—i.e. in fact two balls mounted in succession in the bushing, each being pre-stressed by a spring against a respective orifice. Such a device with a dual ball and spring gives the possibility of ensuring an improved seal.

The proposed solution ensures better resistance of the isolation valve in the case of a fire than known solutions with a decompression device positioned on the outside of the body of the isolation valve. Advantageously, such a solution may be applied in many types of isolation valves, notably with a rotating body like double block and bleed valves (hereafter DBB), (DBB tapered plug valve), DBB double ball valves, spherical plug valves (either a trunnion ball valve—or a floating ball valve), tapered plug valves or cylindrical plug valves. The proposed solution may also be applied in double butterfly valves.

In the continuation of the description, identical elements or with an identical function bear the same reference symbol. For conciseness of the present description, the elements identical with the different examples are not described with reference to each of these examples. In other words, only the differences between the different examples are described in a detailed way, the common elements being described with reference to a single example.

Figure 2:
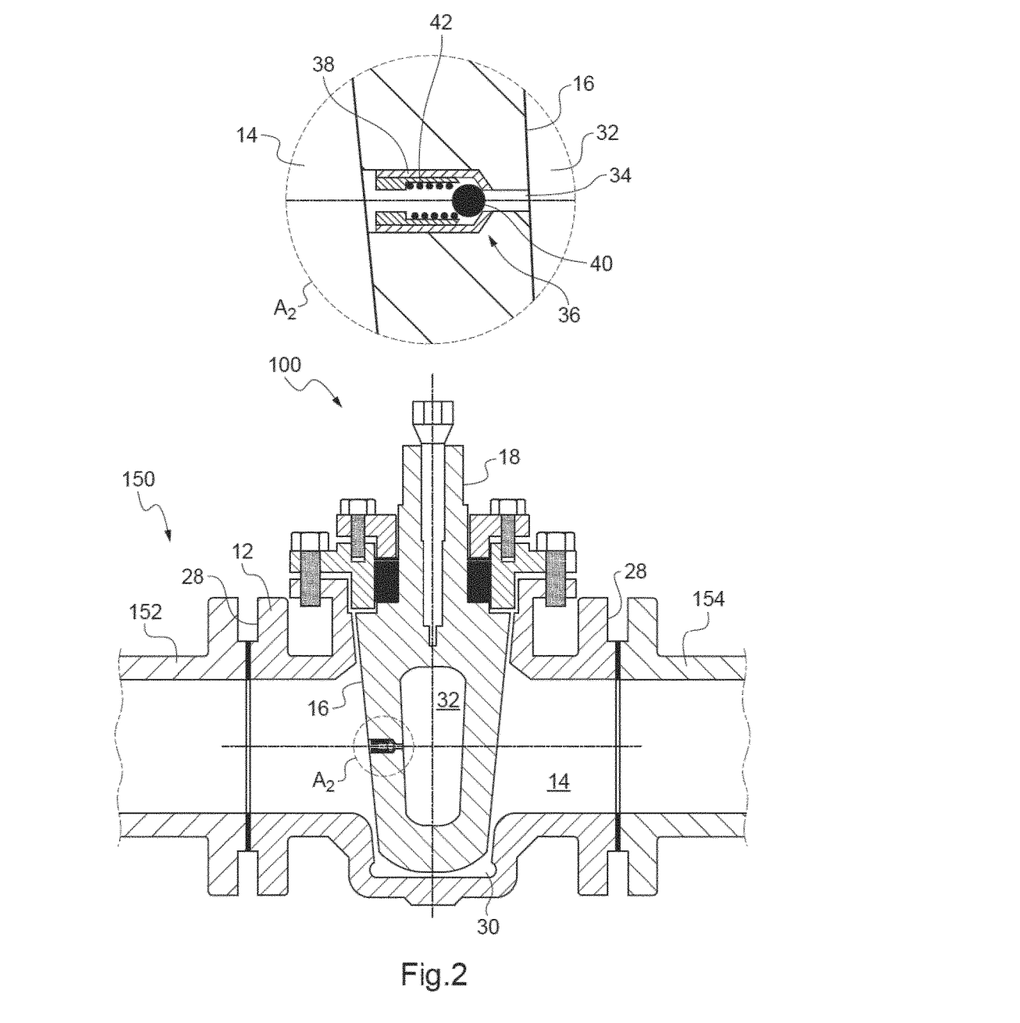
FIG. 2 schematically illustrates a sectional view of an example of an isolation valve with a tapered rotating body, in the obturation position.

FIG. 2 illustrates a first example of a valve with a rotating body 100, of the tapered plug type. In other words, the rotating body of the valve with a rotating body 100 is a tapered plug 16. Here, the isolation valve is illustrated as applied in a hydrocarbon transport facility 150. The isolation valve 100 connects two pipes 152, 154 and gives the possibility of controlling, notably of interrupting, the fluid communication between both pipes 152, 154.

As illustrated, the isolation valve with a rotating body 100 comprises a body 12 inside which is formed a fluid-passing conduit 14. The body 12 forms here at both opposite ends of the fluid-passing conduit 14, flanges 28 intended to allow attachment of the isolation valve with a rotating body 100 on fluid transport conduits. The body also forms a seat 30 adapted for receiving the smallest end of the tapered plug 16.

Inside this tapered plug 16, a cavity 32 is formed. This cavity 32 allows the passing of fluid through the tapered plug 16 when the latter is in its fluid-passing position. However, as illustrated in FIG. 2, this cavity 32 forms a dead chamber when the tapered plug 16 is in its position for obturating the fluid passage. Thus, in this position, some fluid may be confined in the dead chamber, when the tapered plug 16 is in its position for obturating the fluid passage.

Moreover, the tapered plug 16 forms here a stem 18 adapted for being connected to a handle or an actuator for maneuvering the tapered plug 16 between its positions for obturating the fluid passage and for fluid-passing. These positions correspond to two positions angularly separated by a quarter of a turn, of the tapered plug 16.

Here, remarkably, the wall of the tapered plug 16 has a through-hole 34 between the cavity 32 and the fluid-passing conduit 14. Inside this through-hole 34, a decompression device 36 for the pressure in the dead chamber is made. The decompression device is here made as a valve 36 comprising a bushing 38 pierced at both ends, one of the ends being obturated by a ball 40 constrained by a spring 42. The valve may be screwed in or pinned in the through-hole 34 or inserted by any other means ensuring the maintaining of this valve in position in the through-hole 34.

The opening and the closing of such an isolation valve with a tapered rotating body is standard. However, in the position for obturating the fluid passage of the tapered plug 16, the cavity 32 forms a dead chamber comprising fluid.

As explained in the introduction, in the case of an increase in temperature in or around the isolation valve 100, the pressure in the dead chamber increases. However, here, instead of this increase in pressure causing deterioration of the isolation valve 100 and notably of the body 12, this pressure increase will open the valve 36 when the pressure will exceed a threshold valve corresponding to a force exerted on the ball 38, equal to the force of the spring 42. The pressure in the dead chamber will thus be regulated, not being able to exceed this threshold valve. The deterioration of the body of the isolation valve is thereby avoided.

Further, it should be noted that the through-hole may be made on the upstream face of the tapered plug 16, i.e. on the face oriented towards the upstream side of the isolation valve, in the obturation position of the tapered plug 16. Thus, the presence of the through-hole 34 does not prevent isolation of the upstream area from the downstream area of the tapered plug, which is one of the priorities in the case of a fire. In other words, the seal of the downstream area, which is a priority, is thereby ensured. Finally, the absence of any opening of the body 12 outwards ensures better resistance of the isolation valve 10 as compared with known isolation valves which have a decompression device on the outside of the body 12.

Figure 3:
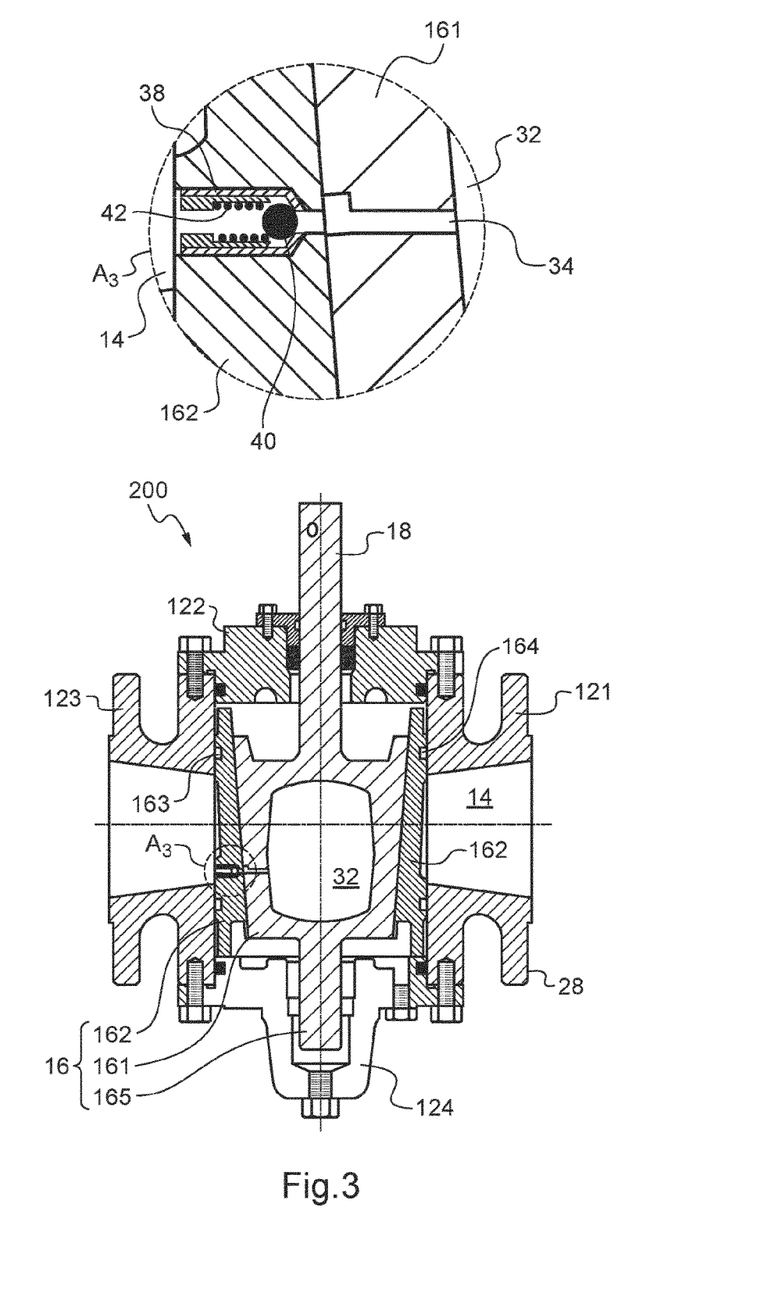
FIG. 3 schematically illustrates a sectional view of a second example of an isolation valve with a tapered rotating body, in the obturation position.

The isolation valve with a rotating body 200 of FIG. 3 is a DBB tapered plug type valve. The body of the isolation valve 200 is made with several distinct parts 121, 122, 123, 124 screwed together. This way of proceeding actually potentially greatly facilitates the making of the body. It should be noted that this way of proceeding is by no means limited to the isolation valve 200 but may quite on the contrary be applied for all the other examples of isolation valves described herein.

As compared with the isolation valve 100, the isolation valve 200 is essentially distinguished by the fact that the rotating body 16 is made here with a tapered plug 161 on which are mounted two translationally free sliders 162 along the axis of the stem 18 of the tapered plug 161. In the position for obturating the fluid-passing conduit 14 (cf. FIG. 3), the sliders 162 are flattened against the body by the tapered plug 161. Gaskets (not shown) positioned in grooves 163, 164 ensure the seal of this obturation position. Further, the tapered plug 161 forms, at its end opposite to the stem 18, a shaft 165 intended to be received in the body of the isolation valve 200 in order to guide the movement of this tapered plug 161 with respect to the body.

In a known way, in this type of isolation valve, the rotating body 16 and the body 12 are adapted so that:
from the obturation position, controlling the control stem causes:
first of all, a displacement of the tapered plug 161 in the direction from its smallest end towards its greatest end, which causes disengagement of both sliders 162 with respect to the body 12, notably giving the possibility of generating play between the gaskets and the body 12. This is notably due to the fact that the translational movement of the sliders 162 in the direction of the axis of the tapered plug 161 is limited or even prevented by the actual body 12;
and then rotation of the tapered plug together with the sliders 162, in order to allow passing of the fluid through the isolation valve 200, the cavity 32 in the tapered plug 161 being in fluid communication with the fluid passage 14; and from the fluid-passing position, rotation of the control stem causes the reverse movement of rotation of the tapered plug together with the sliders 162, and then separation of the sliders 162 which will come into contact on the body.

To do this, the control stem 18 may for example be actuated via a mechanism not shown and known to the person skilled in the art, controlling a 90° rotation successively transposed by means of a cam into a translational and then rotary movement of the stem 18.

In the case of the isolation valve 200, it should be noted that the hole 34 is made through a slider 162 and the tapered plug 161, so as to form a continuous hole in the position for obturating the fluid passage. However, the operation of the decompression valve 36 is identical with the operation described hereinbefore with reference to FIG. 2. The use of a tapered plug 161 in the isolation valve with a rotating body 200 gives the possibility at the beginning of the opening phase of being able to detach the sliders 162 from the walls of the body of the valve by a linear movement of the tapered plug, thereby avoiding any friction between the gaskets positioned inside the grooves 163 and 164 and the body of the valve 121 and 123. Conversely, during the phase for obturating the fluid-passing conduit 14, the linear movement of the tapered plug follows the rotation of the latter thereby giving the possibility of avoiding friction processes between the gaskets positioned inside the grooves 163 and 164 and the body of the valve 121 and 123.

Figure 4:
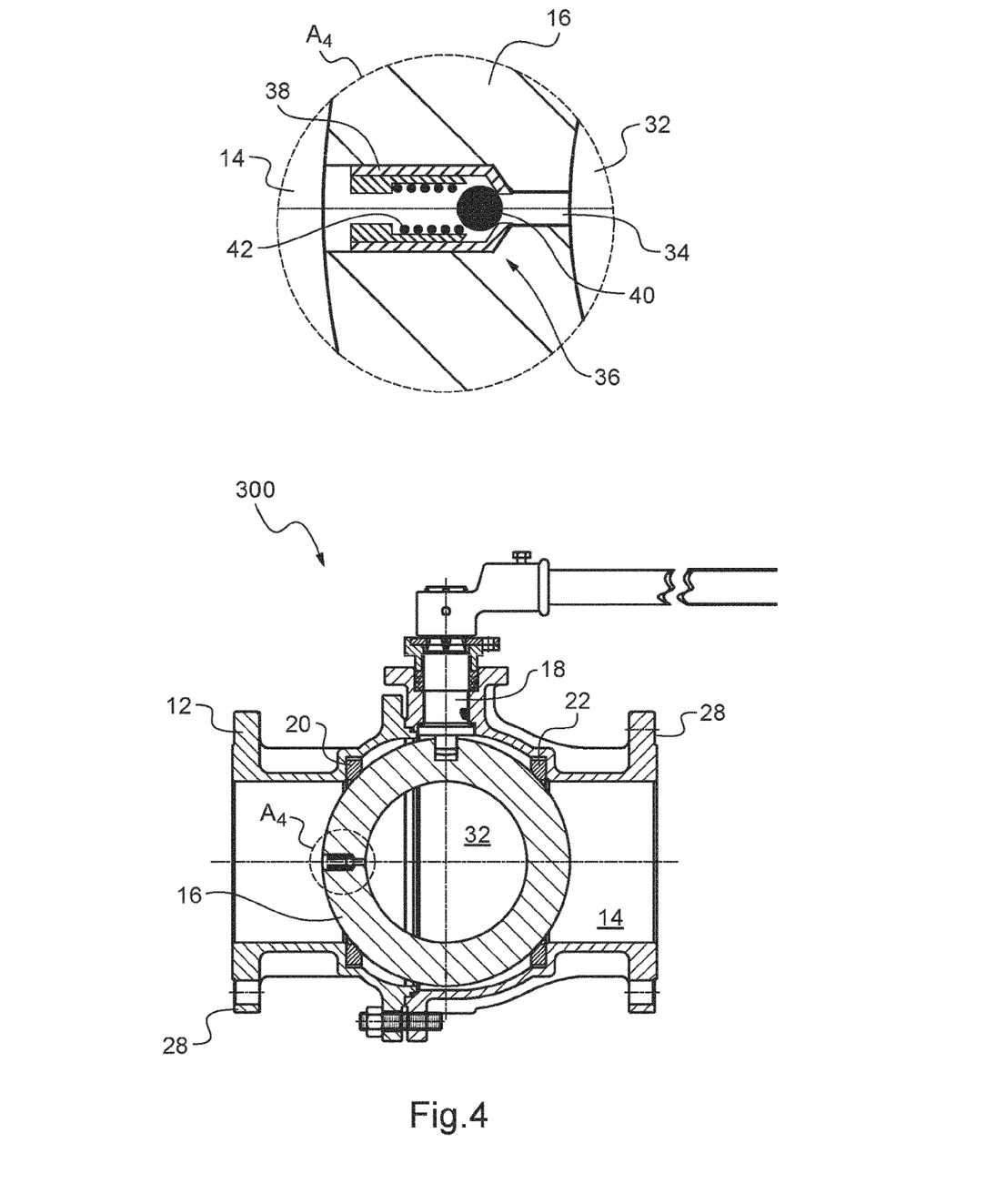
FIG. 4 schematically illustrates a sectional view of a second example of an isolation valve with a spherical ball, in the obturation position.

The isolation valve 300 of FIG. 4 is of the floating ball type. The isolation valve thus has a spherical rotating body 16 secured to a single control stem 18 for the rotation of the spherical ball 16. In particular, the isolation valve does not have any shaft on its end opposite to the control stem 18, intended for guiding the movement of the spherical plug 16 in the body 12.

Here, two seats 20, 22 are applied between the spherical plug 16 and the body 12, this in order to ensure the seal of the isolation valve 300, notably in the position for obturating the fluid passage. The seats 20, 22 may be of the type with a single piston effect or SPE (i.e. the seats are designed so as to become detached from the rotating body in case of overpressure in the chamber) or of the type with a double piston effect or DPE (i.e. the seats are designed so as not to be detached from the rotating body in the case of overpressure in the dead chamber). Preferably, at least one of the two seats is of the DPE type in order to ensure the isolation of the upstream and downstream areas. However, because of the presence of the decompression valve 36, applying two DPE seats may be contemplated. Indeed, maintaining the pressure in the dead chamber at a level acceptable for the rotating body is ensured because of the presence of the decompression valve 36.

Figure 5:
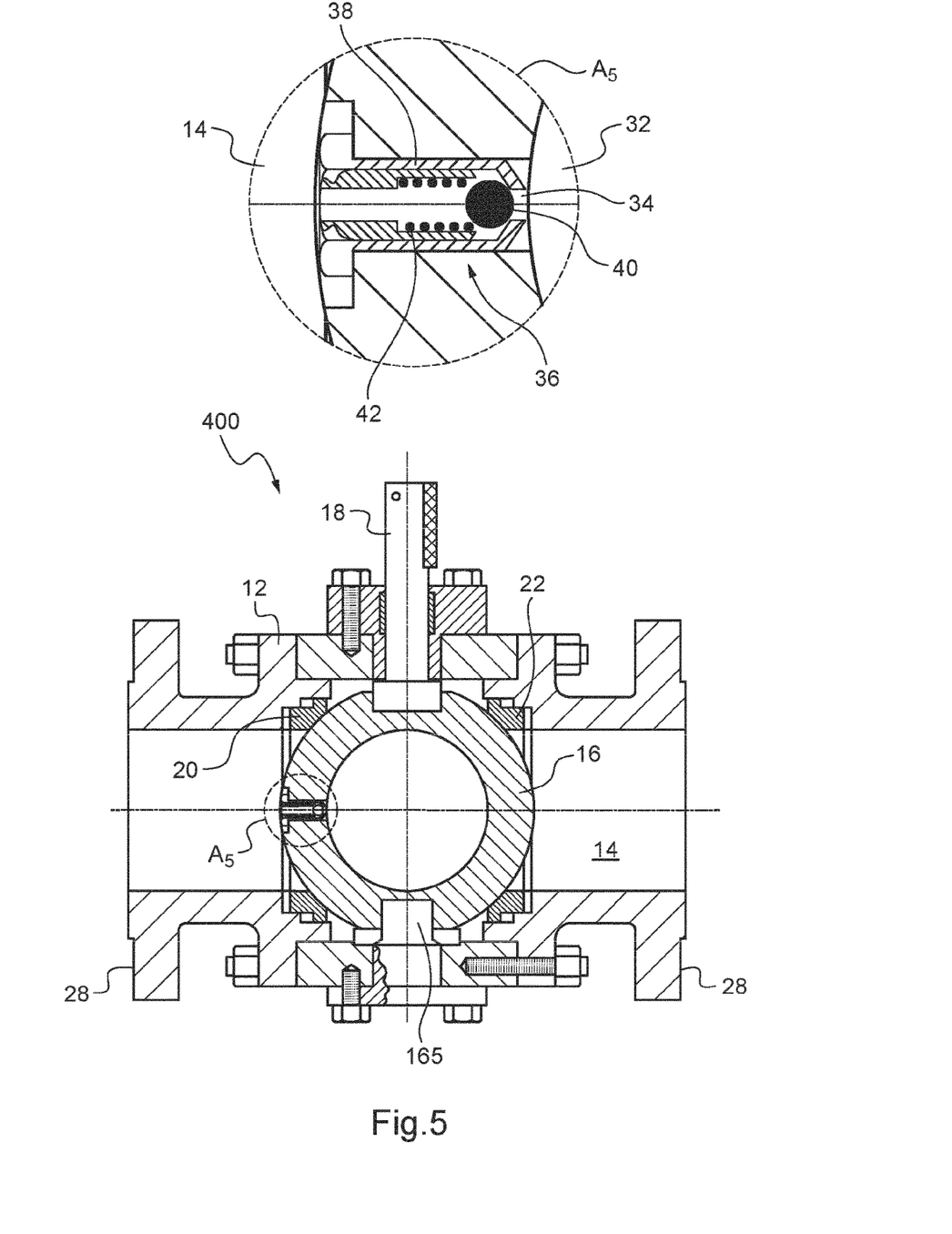
FIG. 5 schematically illustrates a sectional view of a third example of an isolation valve with a spherical ball, in the obturation position.

The isolation valve 400 of FIG. 5 is of the trunnion ball valve type. This isolation valve is distinguished from the isolation valve 300 of FIG. 4 essentially by the presence of a shaft 165 which gives the possibility of guiding more accurately the movement of the spherical plug 16 in the body 12 and of maintaining the plug because of the pressure effects of the fluid on the latter. Further, the decompression valve 36 is here illustrated, screwed inside the hole 34.

Figure 6:
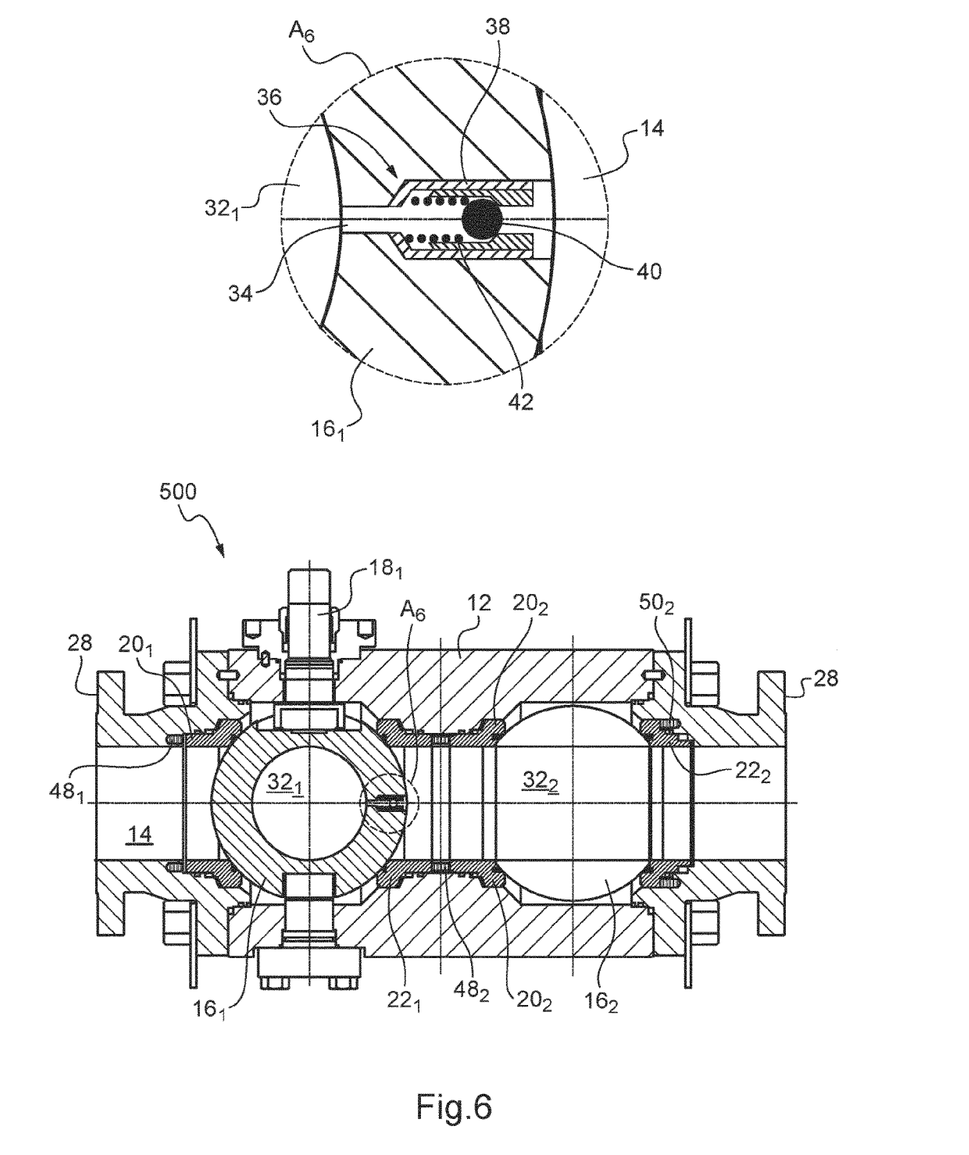
FIG. 6 schematically illustrates a sectional view of an example of an isolation valve with a dual spherical ball, in the obturation position.

The isolation valve 500 of FIG. 6 is of the double block and bleed ball valve (DBB) type. Such an isolation valve is for example described in application FR-A-2 981 720 in the name of the applicant. The isolation valve 500 has two rotating bodies 16₁, 16₂ formed by two spherical plugs with shafts. Alternatively, the spherical plugs may be of the floating ball type. The axes of rotation of both spherical plugs $16_1$, $16_2$ may for example be angularly shifted by a quarter of a turn.

Both spherical plugs $16_1$, $16_2$ are associated with upstream $20_1$, $20_2$ and downstream $22_1$, $22_2$ seats respectively. The seats are of the SPE or DPE type. Preferably, the upstream and downstream seats $20_1$, $22_1$ and the second upstream seat $20_2$ are of the SPE type, the second downstream seat $22_2$ being of the DPE type. The second downstream seat $22_2$ is of the DPE type in order to avoid any leak of fluid towards the downstream side of the isolation valve. Further, the seats are here associated with springs $48_1$, $48_2$, $50_2$ giving the possibility of ensuring the position of the seats against the spherical plugs, even in the case of wear of these seats.

Further, a decompression valve 36 is positioned in a hole 34 formed in the wall of the first spherical plug $16_1$, oriented towards the second spherical plug $16_2$, in the position for obturating the fluid passage. It should be noted here that the decompression valve 36 is made so as to be open in the case of overpressure in the portion of the conduit between both spherical plugs $16_1$, $16_2$ for putting this portion of the conduit in fluid communication between both spherical plugs $16_1$, $16_2$ with the cavity $32_1$ in the first spherical plug $16_1$.

Such an isolation valve has in a known way three dead chambers in the obturation position:
 a first dead chamber in the first spherical plug $16_1$;
 a second dead chamber in the second spherical plug $16_2$; and
 a third dead chamber formed by the portion of the fluid-passing conduit 14 located between both spherical plugs $16_1$, $16_2$.

In the case of a rise of temperature in the first dead chamber, the overpressure in this first dead pressure is limited because of the application of an upstream seat $20_1$ of the SPE type. Indeed, this type of seat is suitable so as to be detached in order to allow passing of fluid in the case of overpressure in the cavity into the first spherical plug. The decompression of this first dead chamber is thus accomplished in the upstream portion of the fluid-passing conduit 14.

Also, in the case of a rise in temperature in the second dead chamber, the overpressure in this second dead chamber is limited because of the application of an upstream seat $20_2$ of the SPE type. The decompression of the second dead chamber is thus accomplished in the third dead chamber. Finally, in the case of an increase in the temperature in the third dead chamber or in the case of an increase in the pressure in this third dead chamber because of the decompression of the second dead chamber, the increase in the pressure in the third dead chamber is limited because of the valve 36 which allows decompression of the third dead chamber in the first dead chamber.

Figure 7:
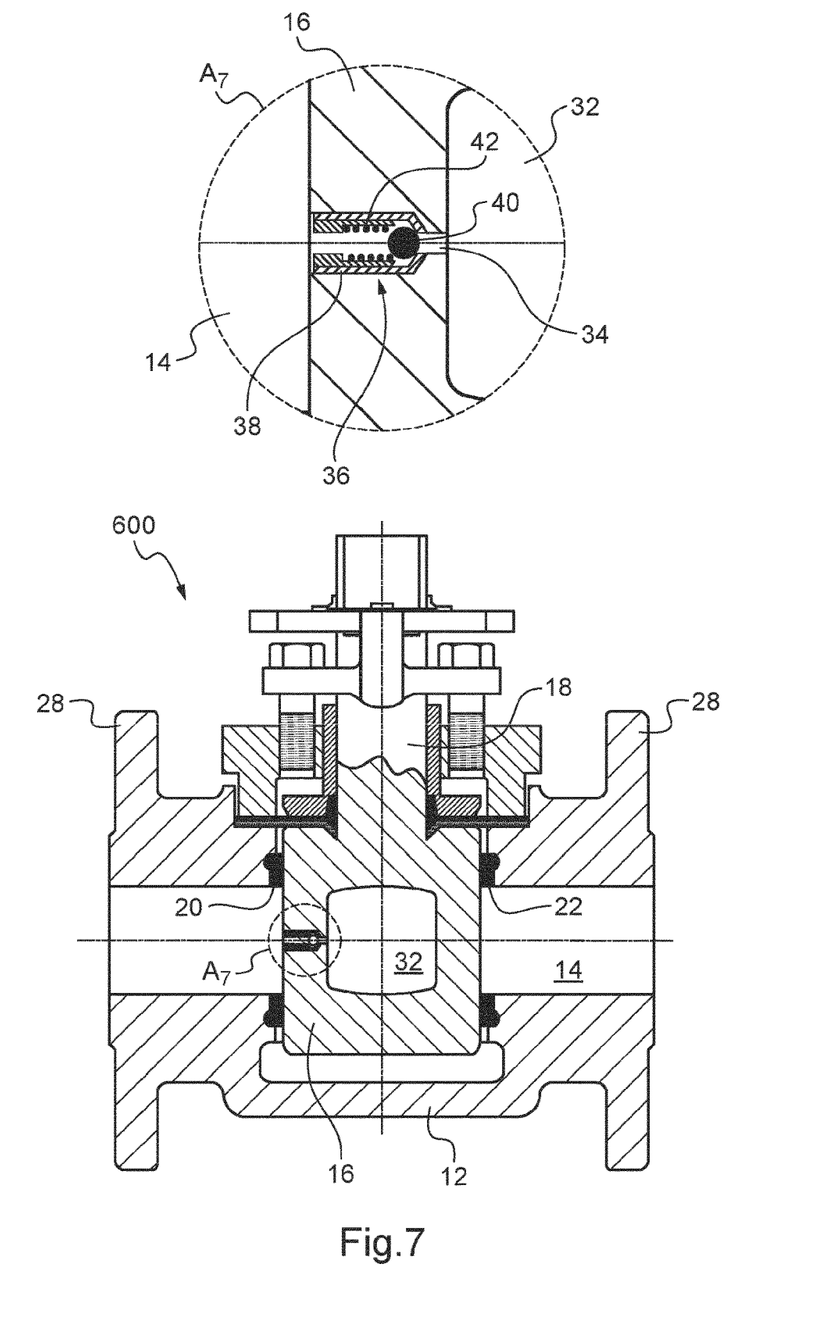
FIG. 7 schematically illustrates a sectional view of an example of an isolation valve with a cylindrical rotating body, in the obturation position.

The isolation valve 600 of FIG. 7 is of the cylindrical plug valve type. In the case of this isolation valve, the rotating body is achieved with a cylindrical plug 16.

Figure 8:
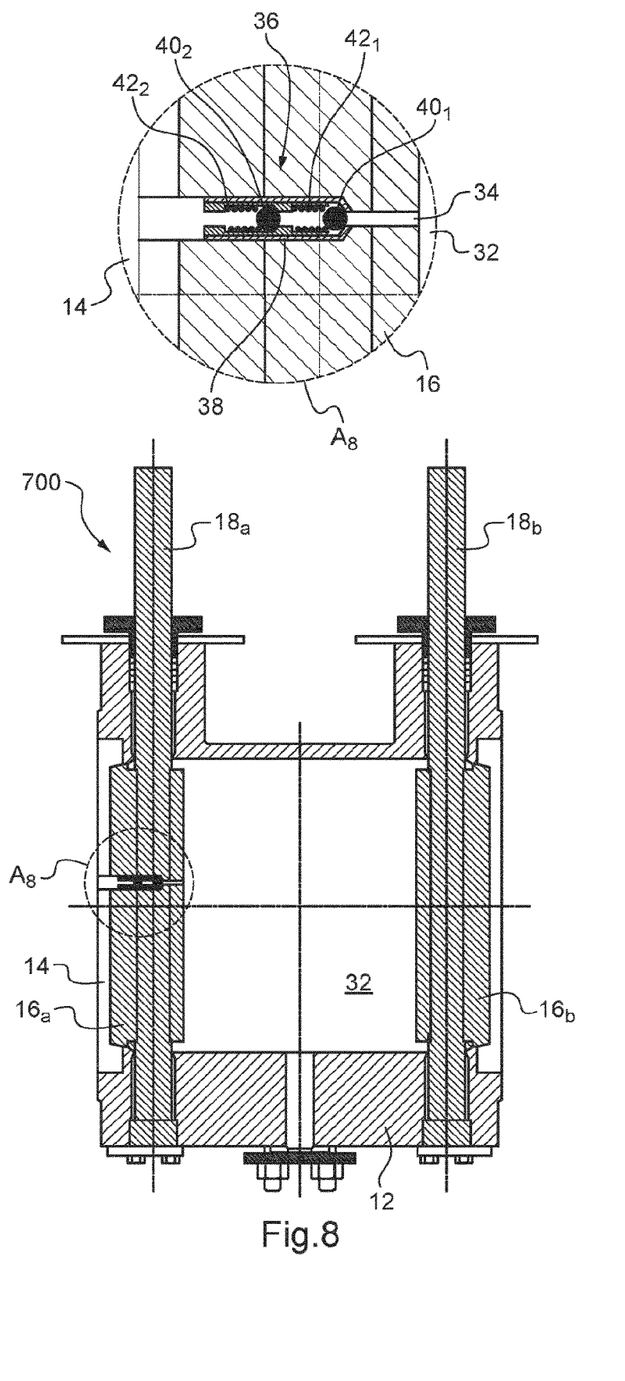
FIG. 8 schematically illustrates a sectional view of an example of an isolation valve with a dual butterfly valve, in the obturation position.

FIG. 8 illustrates an isolation valve 700 of the double butterfly type. In the case of this isolation valve 700, the body 12 forms a fluid-passing conduit 14. The isolation valve 700 comprises a device for obturating the fluid-passing conduit 14 comprising two butterfly valves 16a, 16b positioned downstream from each other in the fluid-passing conduit 14. Both butterfly valves 16a, 16b assume here the shape of discs, for which the section substantially corresponds to the section of the passage conduit 14. Both butterfly valves 16a, 16b are maneuverable independently of each other, the distance between the two butterflies being at least equal to the diameter of the butterfly valves 16a, 16b. The cavity 32 forms a dead chamber in the obturation position of both butterfly valves 16a, 16b. Therefore, in order to avoid a too substantial increase in pressure in this dead chamber, the upstream butterfly valve 16a is provided with a hole 34 inside which a decompression valve 36 is positioned.

Here, the decompression valve 36 includes two balls each urged by a spring against a respective orifice. Such a decompression valve 36 gives the possibility of improving the seal towards the downstream area.

Of course, the present invention is not limited to the embodiments described above, but it may have many alternatives accessible to the person skilled in the art. Thus, in particular, the shape of the decompression valve may differ from the described examples. In particular, all the valves described may be applied in all the described isolation valves. Further, the ball may notably be replaced with any device allowing obturation of an orifice of or in the bushing. These constraining means may also assume other shapes than that of a coil spring, such as for example a leaf spring. In order to give an order of magnitude, the diameter of the ball may for example be comprised between 4 mm and 1 cm.

Further, other decompression devices may also be applied. Further, as an alternative to the spherical plug DBB valve described herein before with reference to FIG. 6, such a valve may include first and second upstream seats of the SPE type and first and second downstream seats of the DPE type. An isolation valve with a quadruple seal in the upstream-downstream direction is thereby obtained. Further, such a valve retains a simple seal in the downstream-upstream direction while allowing decompression of the whole of the three dead chambers towards the upstream side by means of a decompression device in the first installed plug. According to another alternative of this alternative spherical plug DBB valve, the second upstream seat is also of the DPE type and the second spherical plug is equipped with a decompression device suitable for allowing decompression towards the upstream side, from the second dead chamber in the third dead chamber.

The object of the invention also relates to:

Item 1: An isolation valve with a dead chamber, including a body (12) with a fluid-passing conduit (14), an obturation device (16; $16_1$; $16_2$; 16a, 16b) for the fluid passage in the conduit (14), which may be actuated between a fluid-passing position and a position for obturating the fluid passage in the conduit (14), an obturation position in which the obturation device (16; $16_1$; $16_2$; 16a, 16b) forms a dead chamber, a wall of the obturation device (16; $16_1$; $16_2$; 16a, 16b) comprising a through-hole (34), in which is positioned a decompression device (36) of the dead chamber.

Item 2: An isolation valve with a dead chamber according to item 1, wherein the decompression device is formed by a calibrated valve (36).

Item 3: The isolation valve with a dead chamber according to item 2, wherein the calibrated valve (36) is screwed, pinned or forcibly inserted into the wall of the obturation device (16; $16_1$; $16_2$; 16a, 16b).

Item 4: The isolation valve with a dead chamber according to one of the items 1 to 3, wherein the through-hole (34) is made between the dead chamber and the fluid-passing conduit (14).

Item 5: The isolation valve with a dead chamber according to item 4, wherein the through-hole (34) is made in the wall of the obturation device (16; $16_1$; $16_2$; 16a, 16b)

intended to be positioned towards the upstream side of the isolation valve, in a position for obturating the fluid passage in the conduit (14).

Item 6: The isolation valve with a dead chamber according to any of items 1 to 5, wherein the obturation device (16; $16_1$; $16_2$; 16a, 16b) includes a rotating plug (16; $16_1$; $16_2$).

Item 7: The isolation valve with a dead chamber according to item 6, wherein the rotating plug is spherical (16; $16_1$; $16_2$).

Item 8: The isolation valve with a dead chamber according to item 7, wherein the spherical rotating plug (16) is of the floating plug type.

Item 9: The isolation valve with a dead chamber according to item 7, wherein the spherical rotating plug (16; $16_1$; $16_2$) is of the trunnion ball type.

Item 10: The isolation valve with a dead chamber according to one of items 7 to 9, further comprising a second rotating body with a spherical plug ($16_2$), of the floating or trunnion ball type, which may be actuated between a position for obturating the fluid passage in the conduit (14) and a fluid-passing position in the conduit (14), the second rotating body with a spherical plug ($16_2$) defining a second dead chamber in a position for obturating the fluid passage in the conduit (14), a third dead chamber being defined between the two rotating bodies with spherical plugs ($16_1$; $16_2$).

Item 11: The isolation valve with a dead chamber according to item 10, wherein both rotating bodies with spherical plugs ($16_1$; $16_2$) are associated with upstream seats of the type with a simple piston effect, the first rotating body with a spherical plug ($16_1$) being associated with a downstream seat of the type with simple piston effect and the second rotating body with a spherical plug ($16_2$) being associated with a downstream seat of the type with a double piston effect.

Item 12: The isolation valve with a dead chamber according to item 10 or 11, wherein the decompression device (36) is positioned in the wall of the first rotating body with a spherical plug ($16_1$) for allowing decompression of the third dead chamber in the first dead chamber.

Item 13: The isolation valve with a dead chamber according to item 6, wherein the rotating plug (16) is cylindrical.

Item 14: The isolation valve with a dead chamber according to item 6, wherein the rotating plug (16; 161) is tapered.

Item 15: The isolation valve with a dead chamber according to item 14, wherein the rotating body also comprises two sliders (162) translationally mounted on the tapered plug (161) in the body (12), for example by means of a dovetail, so that a translation of the tapered plug (161) along its axis induces translation of both sliders (162) along a direction substantially perpendicular to the direction of the axis of the tapered plug (161).

Item 16: The isolation valve with a dead chamber according to item 15, wherein the decompression device (36) of the dead chamber is positioned in one of both sliders (162).

Item 17: The isolation valve with a dead chamber according to one of items 14 to 16, wherein the tapered plug (16; 161) has a shaft (165) for guiding the rotation of the rotating body.

Item 18: The isolation valve with a dead chamber according to any of items 1 to 5, wherein the obturation device includes two butterflies (16a, 16b) positioned downstream from each other in the fluid-passing conduit (14).

Item 19: The isolation valve with a dead chamber according to item 18, wherein the decompression device (36) is positioned in the wall of a butterfly valve (16a, 16b), preferably in the wall of the upstream butterfly valve (16a).

Item 20: A hydrocarbon transport facility (150) including at least two pipes (152; 154) connected through an isolation valve with a dead chamber according to any of the preceding items.

The invention claimed is:

1. An isolation valve with a dead chamber for piping conveying hydrocarbons, the isolation valve comprising:
   a body with a fluid-passing conduit, and
   an obturation device for obturating the fluid passage in the conduit, the obturation device including a rotating body which is actuated between a fluid-passing position and a position for obturating the fluid passage in the conduit, the rotating body forming a dead chamber in the position for obturating the fluid passage in the conduit, a wall of the obturation device comprising a through-hole, the rotating body comprising a tapered rotating plug,
   wherein the rotating body also comprises two sliders translationally mounted on the tapered rotating plug in the body so that a translation of the tapered rotating plug along an axis thereof induces translation of both sliders along a direction substantially perpendicular to the axis of the tapered rotating plug,
   wherein the through-hole extends through one of the sliders and the tapered rotating plug so as to form a continuous hole in the position for obturating the fluid passage in the conduit,
   wherein the obturation device includes a decompression device that is positioned in the slider with the through-hole.

2. The isolation valve with a dead chamber according to claim 1, wherein the decompression device is formed by a calibrated valve.

3. The isolation valve with a dead chamber according to claim 2, wherein the calibrated valve is screwed, pinned or forcibly inserted into the slider of the obturation device with the through-hole.

4. The isolation valve with a dead chamber according to claim 1, wherein the through-hole is made between the dead chamber and the fluid-passing conduit.

5. The isolation valve with a dead chamber according to claim 4, wherein the through-hole is made in the wall of the obturation device intended to be positioned towards the upstream side of the isolation valve, in a position for obturating the fluid passage in the conduit.

6. The isolation valve with a dead chamber according to claim 1, wherein the tapered plug has a shaft for guiding the rotation of the rotating body.

7. A piping for conveying hydrocarbons comprising at least two pipes connected through an isolation valve with a dead chamber, the isolation valve comprising:
   a body with a fluid-passing conduit,
   an obturation device for obturating the fluid passage in the conduit, the obturation device including a rotating body which is actuated between a fluid-passing position and a position for obturating the fluid passage in the conduit, the rotating body forming a dead chamber in the position for obturating the fluid passage in the conduit, a wall of the obturation device comprising a through-hole, the rotating body comprising a tapered rotating plug,
   wherein the rotating body also comprises two sliders translationally mounted on the tapered rotating plug in the body so that a translation of the tapered rotating plug along an axis thereof induces translation of both sliders along a direction substantially perpendicular to the axis of the tapered rotating plug, wherein the through-hole extends through one of the sliders and the tapered rotating plug so as to form a continuous hole in the position for obturating the fluid passage in the conduit, wherein the obturation device includes a decompression device that is positioned in the slider with the through-hole.

8. The piping for conveying hydrocarbons according to claim 7, wherein the decompression device is formed by a calibrated valve.

9. The piping for conveying hydrocarbons according to claim 8, wherein the calibrated valve is screwed, pinned or forcibly inserted into the slider of the obturation device with the through-hole.

10. The piping for conveying hydrocarbons according to claim 7, wherein the through-hole is made between the dead chamber and the fluid-passing conduit.

11. The piping for conveying hydrocarbons according to claim 10, wherein the through-hole is made in the wall of the obturation device intended to be positioned towards the upstream side of the isolation valve, in a position for obturating the fluid passage in the conduit.

12. The piping for conveying hydrocarbons according to claim 7, wherein the tapered plug has a shaft for guiding the rotation of the rotating body.

13. An isolation valve with a dead chamber for piping conveying hydrocarbons, the isolation valve comprising:
a body with a fluid-passing conduit;
an obturation device for controlling fluid flow through the fluid-passing conduit, the obturation device including a rotating body that is moveable between an open position and a closed position, the rotating body including a tapered rotating plug that forms a dead chamber in the obturation device when the rotating body is in the closed position, the tapered rotating plug having a wall with a through-hole disposed in fluid communication with the dead chamber; the rotating body including two sliders translationally mounted on the tapered rotating plug so that translation of the tapered rotating plug along an axis of the tapered rotating plug induces translation of the two sliders along a direction substantially perpendicular to the axis of the tapered rotating plug the through-hole extending through one of the sliders; and a decompression device positioned in the slider with the through-hole, wherein translation of the tapered rotating plug along the axis of the tapered rotating plug brings the through-hole in the wall of the tapered rotating plug into alignment with the decompression device when the tapered rotating plug is in the closed position so as to form a continuous hole that extends through the wall of the tapered rotating plug and the slider with the decompression device.

14. The isolation valve with a dead chamber according to claim 13, wherein the decompression device is a calibrated valve.

15. The isolation valve with a dead chamber according to claim 13, wherein the decompression device is screwed, pinned or forcibly inserted into one of the sliders.

* * * * *